April 19, 1949.   H. B. OWENS ET AL   2,467,565
PROCESS AND MEANS FOR PRODUCING
ARTIFICIAL FLOWER LEAVES
Filed June 27, 1945   4 Sheets-Sheet 1

INVENTORS.
HENRY B. OWENS,
JOHN H. DERRICK.
BY
Leon M. Strauss
AGT.

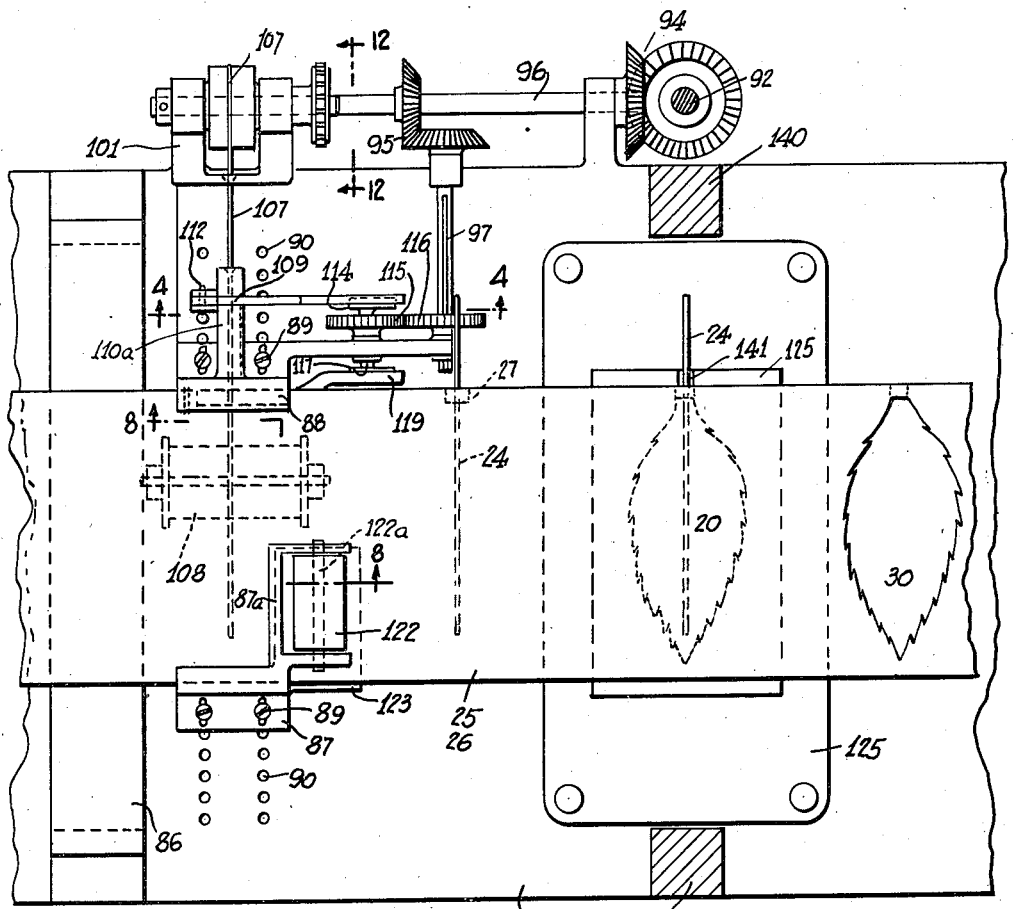

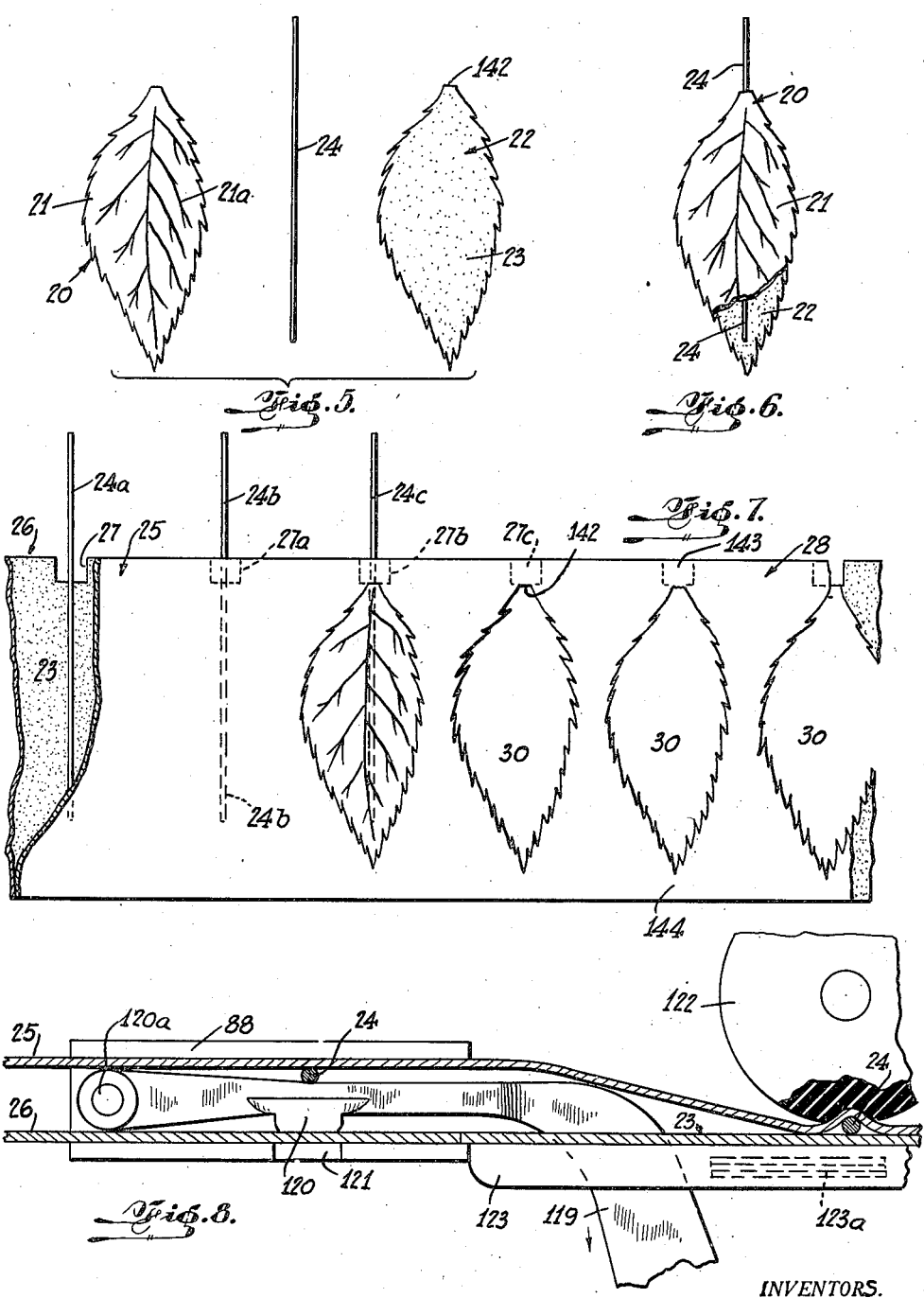

April 19, 1949.                H. B. OWENS ET AL                2,467,565
                          PROCESS AND MEANS FOR PRODUCING
Filed June 27, 1945          ARTIFICIAL FLOWER LEAVES              4 Sheets-Sheet 4
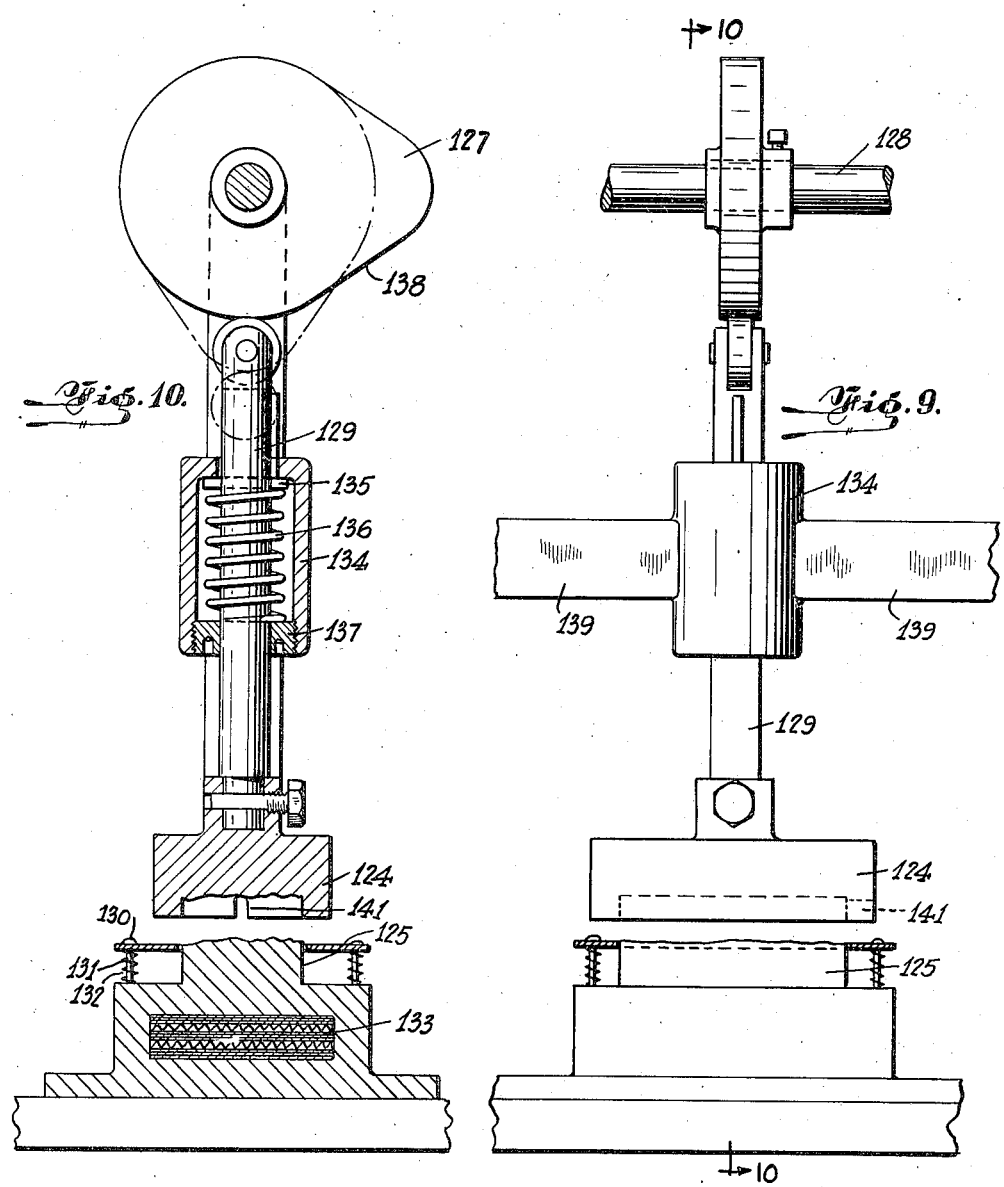
INVENTORS.
HENRY B. OWENS.
JOHN H. DERRICK.
BY
Leon M. Strauss
AGT.

Patented Apr. 19, 1949

2,467,565

UNITED STATES PATENT OFFICE 2,467,565

PROCESS AND MEANS FOR PRODUCING ARTIFICIAL FLOWER LEAVES

Henry B. Owens and John H. Derrick, New York, N. Y., assignors to The Leaf Manufacturing Corporation, New York, N. Y.

Application June 27, 1945, Serial No. 601,762

11 Claims. (Cl. 154—75)

This invention generally relates to process and means for producing laminated articles made from substantially non-rigid material and refers more particularly to process and means for manufacturing laminated leaves or similar articles used in the artificial flower or related industries, said articles being preferably traversed by a wire or similar element which forms the stem and also a stiffening means for the article.

It is one of the main objects of this invention to automatically and continuously produce artificial flower leaf or leaves.

It is another object of the invention to provide means for fabricating from an endless roll or rolls of non-rigid material flat laminated articles, such as leaves, each having between the laminae an element imparting a predetermined stiffness to the article or articles and extending with one end within and short of the boundary of the article.

It is a further object of this invention to provide an uninterrupted process for producing articles of the kind described from band or tape means moved from one station for feeding or unwinding said tape means to another station at which said tape means is again wound up or collected.

Yet, another object of this invention is to provide means for producing a plurality of laminated articles in succession from tape means, the latter being moved in timed relation to positively guided severing means.

Still a further object of this invention is to provide a process for joining or welding together a plurality of tape means fed from endless rolls and to expose in the course of said process said tape means to the influence of heat and pressure.

Still another object of this invention is to provide means affording the connection of a thermoplastic or like backing with a top layer of non-rigid material in superposed relation and with pliable stiffening means positioned therebetween to thereby obtain formable article or articles.

A still further object of this invention is to provide process and means for inexpensively manufacturinng artificial flower leaves of varying sizes and shapes, the steps of said process being simple and easily to coordinate to each other so as to insure speedy mass production of said articles.

These and other objects and advantages will become more apparent from the ensuing description of the invention, and will be further clearly understood by referring to the accompanying drawings.

In the drawings:

Fig. 3 is an enlarged plan view of the wire cutting and leaf die mechanism;

Fig. 4 is an enlarged diagrammatic detail view of the wire cutting mechanism taken along line 4—4 of Fig. 3;

Fig. 5 is an exploded view of the three component parts of each leaf;

Fig. 6 is a plan view (partly broken away) of a completed leaf;

Fig. 7 is a diagrammatic plan view of the tapes of which the leaf is formed and illustrating progressive steps of the formation of the leaf;

Fig. 8 is an enlarged diagrammatic sectional view of the tape notch-cutting mechanism taken along line 8—8 of Fig. 3;

Fig. 9 is an enlarged, side-elevational view of the leaf forming die and its mechanism;

Fig. 10 is a sectional view of the mechanism of Fig. 9 taken along line 10—10 of Fig. 9.

Fig. 11 is a diagrammatic view of the operative parts or means working on the tapes and shown in their respective relation to each other;

Fig. 12 is a respective detail view of the wire feed mechanism, taken along line 12—12 of Fig. 3.

Figure 2:
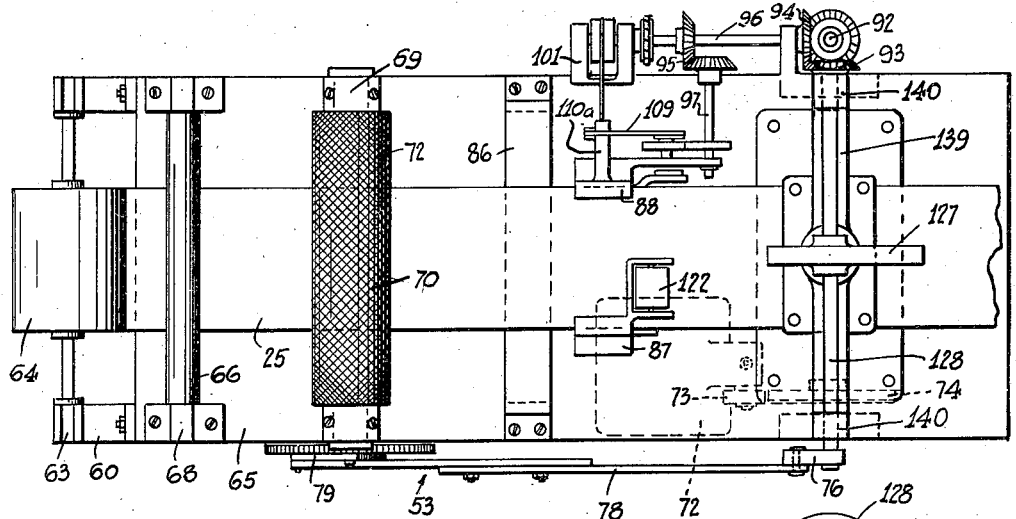
Fig. 2 is a top plan view of the machine shown in Fig. 1.

Referring now in greater detail to the attached drawings, there is disclosed for the purpose of arriving at the present invention a substantially flat article, such as an artificial flower leaf 20. This article comprises a top layer 21 made of a non-rigid, preferably fabric or like appropriate material which may be suitably dyed and embossed as at 21a; a backing or base layer 22 made of paper or other cellulosic material provided on one of its faces with a prefarably thermoplastic substance 23; and a metal wire or like stem-forming element 24 of relatively stiff, but pliable material juxtaposed with respect to said top layer 21 (Figs. 5 and 6). This element 24 extends from one end or edge of the leaf 20 toward an opposite edge of said leaf (Fig. 6) to terminate a predetermined distance and short of said opposite edge so that one end of said element 24 is located short of and within the perimeter or boundary of leaf 20.

In order to continuously produce such leaf articles, provision is made to cut out said top layer and base layer from respective tapes 25, 26 when the same are brought into joined and intimate position. To this end, tape 26, as seen in Fig. 7, is covered with any known thermoplastic material or another suitable binding mass 23 which may harden under the influence of applied heat and pressure. As shown in Fig. 7, lower tape or band 26 is provided with a series of spaced notches 27, 27a, 27b, 27c, etc. for a purpose later described.

Between said welded or joined tapes 25, 26, there are interpositioned in spaced relation to each other stem-forming elements, such as pieces of wire 24a, 24b, 24c, each of predetermined length as will be easily realized.

By successive cutting or stamping operations out of thus prepared tapes 25, 26 by means of suitably shaped die mechanisms or severing means, hereinafter more fully described, leaflike laminated articles, such as illustrated in Fig. 6, are obtained.

Each of these laminated articles consists of at least two layers 21, 22 with interposed wire element 24. The remnant or waste portion 28 of tapes 25, 26 in their welded condition and after the respective leaves have been stamped out and removed, thus leaving spaces or openings 30 in said tape waste portion 28, is wound up on conventional reel means, such as indicated at station 29 (Fig. 11).

In order to more clearly explain the steps of producing the article herein described, it will be realized that mechanisms and means for continuously manufacturing said article mainly consist of the following parts:

The rack 50 with take-off reels, the guide rollers 51, the intermittently operated set of feeding or pulling rollers 52, the driving and regulating mechanism 53, the wire supply and notch mechanism 54, the stamp or die 55 with cam drive 56 and the take-up reel 29.

Rack 50 consists of the bracket 60 having an inclined slot 61 forming a bearing for the axle of lower reel 62 and the slot 63 acting as a bearing for the axle of upper reel 64. Brackets 60 and other parts hereinafter described are affixed to a table or frame 65.

Guide rollers 66 and 67 are mounted for rotation within the bracket 68, top roller 66 being adjustable with respect to roller 67 at 66a and acting as a pressure roller. The tapes 25, 26 hereinabove referred to running from reels 62, 64 to reel station 29 (Fig. 11) pass between said guide rollers 66, 67 unto the bracket 69 carrying the tape pulling or feed rollers 70 and 71. Rollers 70, 71 are preferably provided with knurled surfaces 72 for enhancing the gripping action on and forward movement of the tapes 25 and 26.

The roller 71 is geared to the intermittent driving mechanism 53 which causes advancing movement of tapes 25 and 26 from one die operation position to the adjacent one. This movement occurs intermittently and is brought about by means of a motor M with reduction gearing including a gear 73 in mesh with a larger gear 74. Gear 74 is mounted on shaft 75 which also carries a crank arm 76 provided with slot 77 for adjustment purposes and for varying the effective length of arm 76, as it is well understood. An adjustable lever 78 is attached at its one end to crank arm 76 and at its other end to the ratchet arm 79 which in turn is fulcrumed on shaft 80, the latter also carrying the feed roller 71. Arm 79 is mounted on shaft 80 to swing freely and idly on the latter. About at the middle of arm 79, there is located a driving pawl 81 and spring 82 which keeps said pawl in contact with a ratchet wheel 83 suitably keyed to shaft 83a which is supported by frame 65 (not shown). Ratchet wheel 83 is in turn secured to a gear 84 which is also affixed to shaft 83a and is in mesh with a pinion 85 mounted on shaft 80.

It does not afford any difficulty to realize from the above, that the reciprocating movement (according to arrow A) of the adjusted lever 78 will cause the ratchet 81 to intermittently advance on ratchet wheel 83, thus causing gears 84, 85 to intermittently drive pulling roller 71.

Tapes 25, 26 now pass, respectively, over and under the separator member 86 supported on bracket 86a from where the two tapes 25, 26 are guided between tracks or guide pieces 87, 88 (Figs. 2 and 3). Guide pieces 87, 88 are secured to the table 65 by means of bolts 89. As it may be desired to change the width of the tapes 25, 26 according to the size and shape of the article to be manufactured, threaded holes or openings 90 for engagement with said bolts 89 are provided in the surface of the table 65 for the aforesaid purpose.

Shaft 75 is geared by means of bevel gears 91 to an upright shaft 92, which is supported in several spacedly arranged bearing blocks 93. The set of bevel gears 94 connects shaft 92 with a pair of bevel gears 95, which drive the shafts 96 and 97. Shaft 96 is arranged to drive a shaft 98 by means of a chain 99 and sprocket wheels 100.

Shafts 96 and 98 are mounted within the bearing block 101. Secured to shaft 98 is a wire pulling roller 102 having the groove 103 and in contact therewith the roller 104 with the complementary groove 105. This roller 104 is pressed against roller 102 by means of a pressure spring 106.

Wire 107 is fed from reel 108 which is supported by table 65 at 108a, the wire running between rollers 102 and 104 into the cutting device 109 provided with the cutting edge 110 (Fig. 4). The cutting arm 111 is fulcrumed at 112 and secured at 113 to an eccentric 114 which in turn is driven by gears 116, 115 from the shaft 97 and bevel gears 95 (Fig. 3). Gear 115 is mounted on and fixed to shaft 117 which carries adjacent its end an eccentric 118 (similar to that designated by numeral 114), which in turn connects by means of the arm 119 to a notch cutter 120 which is fulcrumed at 120a (Fig. 8). The guide piece 88 for this purpose is provided with a cut out at 121, permitting cutter 120 to cut through backing tape 26 notches 27, 27a, 27b, 27c, etc. only at predetermined intervals and in timed relation to the relative movements of the wire 107 (transverse movement) and tapes 25, 26 (longitudinal movement).

The wire 107, as above mentioned, is cut at 110 after the wire has been fed through rollers 105—103 along guide 110a which is provided with a longitudinal lateral discharge slot 110b of appropriate shape. The thus cut wire 24 of predetermined length has been previously inserted between tapes 25 and 26 as it is apparent from Fig. 3 and shown in detail in Figs. 5 and 6. To prevent any shifting of the wire 24 after having been cut to desired length, it is desired to immediately compress at least portions of the tapes 25 and 26 together for which reason guide piece 87 may carry on extension bracket 87a the soft rubber roller 122 journaled on shaft 122a. Roller 122 may be made to slide lengthwise of guide 87 for adjusting purposes. Instead of pressure roller 122 any other suitable means may be applied to maintain inserted wire piece 24 at its location of insertion. Guide piece 87 further carries an electrically heated table portion 123 at 123a which will permit the thermoplastic material 23 of tape 26 to soften sufficiently so as to cause tapes 25, 26 to adhere to each other, thus holding fed wire piece 24 securely in place while passing under resilient roller 122.

Figure 1:
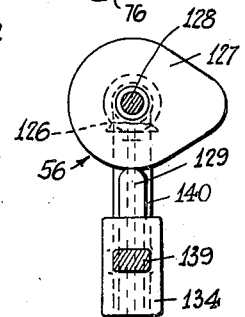
Fig. 1 is a side-elevational view of the machine for producing artificial leaves.
Figure 1:
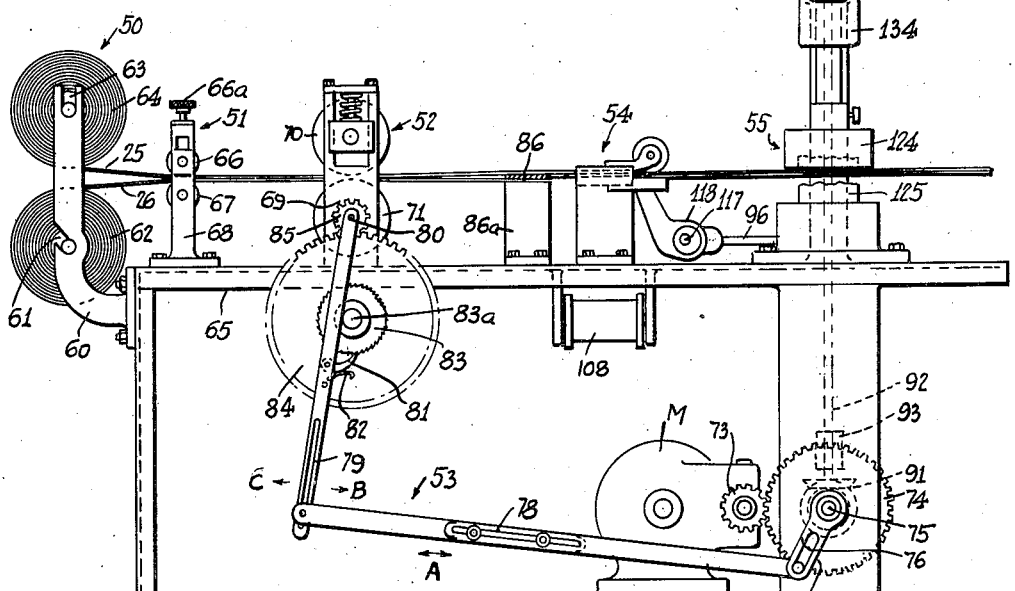

Tapes 25, 26 with properly spaced wire lengths 24 are now ready to enter between female die 124 and male die 125 (Figs. 1, 9 and 10). Driven from shaft 92 by means of bevel gears 126 is an eccentric wheel 127 mounted on shaft 128. The rotation of the cam or eccentric wheel 127 causes plunger 129 to which the die member 124 is secured, to descend upon the male member 125 whereby articles of desired shape and form, such as artificial flower leaves, may be cut out in mass production. To prevent the adhering tape portions from which the cut out has been made from sticking to the male die member 125, it is desirable to provide pusher or ejector means 130 which is held captive and guided on pins 131 carrying coil springs 132 so as to ensure that ejector plate 130 will always be retracted to its uppermost position.

The male die 125 is preferably provided with a heating element 133. Plunger 129 is carried within hollow bearing 134 affixed to said plunger by a transverse pin 135.

A coil spring 136 in pressing against the said pin 135 and against the closure plate 137 will keep plunger 129 in its uppermost position and in engagement with the surface 138 of cam 127. Hollow bearing 134 is provided with arms or ribs 139 to connect the bearing 134 with the standards or uprights 140 which in turn are secured to the table 65 (Figs. 2, 9 and 10).

It is well understood that the die members 124 and 125 are designed to be easily replaced and exchanged according to shape and size of the material to be stamped out.

It is also apparent from the drawings that the female die member 124 is provided with a slot 141, which provides clearance for wire 24 protruding from one end of the joined tapes 25, 26 during the punching or severing operation. As can be readily seen from Fig. 7, it is essential to provide the notch 27 extending transversely to one of said tapes and from one side edge thereof up to the end 142 of the article to be stamped out, thus permitting wire 24 and the leaf 20 to be readily removed from joined tapes 25, 26, at the same time however, providing for material 143 and 144 to be left at both ends of the cut out article so as to facilitate and permit the collecting or winding up of the remnant or waste tape 28 (Fig. 11) at reel station 29.

The operation of the machine is as follows:

Two reels of material 62 and 64 are placed in the bracket 69. The reel 64 carries a tape roll of a suitable, water-repellent and dyed material used for the top surface of an artificial leaf or like article, while the lower reel 62 carries a roll of a tape of material having that side facing the top tape 25 covered with a thermoplastic or other cementing mass. The two tapes 25, 26 are now threaded between the guide roller 66 and 67 and pulled through the intermittently working feeding rollers 70, 71, thence over and under the separator member 86 to the guide means, notch mechanism and wire supply at 54, and finally between the female and male die members 124, 125 unto the waste wind-up reel at 29.

By starting motor M, the same will drive by means of pinion 73 and gear 74 the shaft 75.

Rotation of arm 76 will impart a reciprocating movement to the lever 78 which will cause the ratchet lever 79 to swing to and fro, thus bringing about rotation of gear 84 by means of driving pawl 81 on the ratchet wheel 83.

The movements of lever 79 in the direction of arrow B cause feeding or pulling roller 71 to be rotated clockwise, whereas the same remains stationary when lever 79 is moved in the direction of arrow C. During the time period when feeding roller 71 remains stationary tapes 25, 26 will be prevented from forward movement, thus will be held stationary in the machine, during which time the following steps of the process and function of the following parts take place:

Wire 107 is cut into the desired piece length 24 by the cutting mechanism 109—110, notch 27 is cut into tape 26 by means of cutter 120 and female die 124 descends upon male die 125, thus causing the previously prepared article and now advanced in timed relation to the die mechanism 55—56, so as to be cut out of the welded tapes 25, 26 with a wire length 24 therebetween.

In accordance with the design of the machine, it may take several intermittent motions before the prepared tapes 25, 26 with newly cut notch 27 and the inserted wire length 24 reach the die members 124, 125.

The cut out article, such as leaf 20, can be readily removed by hand from between the cutting dies 124, 125.

Any conventional means, such as jets of compressed air; automatically released sweeping devices, such as rotary brushes; or suction devices of any known construction (not shown) may be employed for such purpose.

It is well understood that the thickness and quality of the material of the tapes may vary according to the articles to be produced and that the coating herein referred to may be thermoplastic (containing nitrocellulose with resins and plasticizer), or of pressure-sensitive adhesive character. The process may also be carried out with a dry-gluing mass, lacquer or veneer having binding properties, plastics and plastic compositions suitable for the purpose of effectuating adhesion and firm connection of the laminae of which the resultant article consists. The wire element herein described may be covered with cotton, paper, etc., if desired, and may have any shape or configuration (flat, oval, etc.).

The machine may be equipped with conventional controlling and motion interrupting devices to automatically stop the machine, if any obstruction, tearing of the tape material, etc., should occur.

According to the present invention, there has been provided a process and means for producing laminated articles, such as artificial flower or plant leaves with stems, which consists in joining together a plurality of endless tapes made of non-rigid material, at least one of said tapes being provided with a mass susceptible of joining said tapes together, introducing between adjacent tapes a stem-forming element made of a material relatively more rigid than said tape materials and extending short of that edge of said tapes positioned opposite the edge from which said element is introduced, subjecting said joined tapes with said introduced element to a stamping operation to thereby provide a cut-out article, removing said article from the remainder of said joined tapes, and finally winding up the remainder of said joined tapes.

While there have been shown and described and pointed out the fundamental novel features of the invention as applied to the above embodiment, it will be understood that various omissions and substitutions and changes in the form and details of the device and methods above described and illustrated may be made by those skilled in the art without departing from the spirit of the invention.

Having thus described the invention, what is claimed as new and desired to be secured by Letters Patent, is:

1. The method of continuously producing laminated articles in the form of leaves with stems, which consists in feeding elongated tapes of equal length and in superposed position in substantially lengthwise direction of said tapes, maintaining said tapes in spaced apart relation to each other while being fed, then inserting transversely to said tapes therebetween pieces of stem-forming material in spaced apart relation to each other, whereby the latter project from one of the edges of said tapes therebeyond toward the opposite edges of said tapes but short of the latter edges, thereafter bonding said superposed tapes together so as to obtain a continuous and bonded tape reinforced with said stem-forming pieces encased therein, subjecting said continuous bonded tape to die-cutting operation in which that part of said bonded tape containing a respective piece of stem-forming material and positioned intermediate said edges is removed from said bonded tape, and finally collecting the remainder of said tape with at least one of said edges substantially intact.

2. The method of continuously producing laminated articles in the form of leaves with stems, which consists in feeding elongated tapes of equal length and in superposed position in substantially lengthwise direction of said tapes, maintaining said tapes in spaced apart relation to each other while being fed, then inserting transversely to said tapes therebetween pieces of stem-forming material in spaced apart relation to each other, whereby the latter project from juxtaposed edges of said tapes therebeyond toward opposite edges of said tapes but short of the latter edges, thereafter bonding said superposed tapes together so as to obtain a continuous and bonded tape reinforced with said stem-forming pieces encased therein, subjecting said continuous bonded tape to die-cutting operation in which that part of said bonded tape containing a respective piece of stem-forming material and positioned intermediate said edges is removed from said bonded tape, and finally reeling up the remainder of said tape with at least one of said edges substantially intact.

3. The method of continuously producing laminated leaf articles with stems, which consists in feeding a plurality of tapes of non-rigid material, coating one of said tapes on the surface thereof with a bonding material, superposing said tapes in spaced apart relation so that said coated surface of said one tape faces the surface of said other tape, advancing said tapes simultaneously and intermittently in the direction of feed of said tapes, cutting notches in at least one edge of said tapes, feeding pieces of stem material, and inserting successively said pieces of stem material in transverse direction to said tapes and therebetween at locations thereof where notches have been cut so that said pieces of stem material project with one end thereof from between the edges at one side of said tapes toward the edges on the opposite side of said tapes but short of the latter, bonding said tapes to said pieces of stem material so as to prevent displacement thereof relative to said tapes, then severing said leaf articles from said bonded tapes at the locations of said pieces of stem material, and finally collecting the remainder of said tapes.

4. The method of continuously producing laminated leaf articles with stems, which consists in feeding a plurality of tapes of non-rigid material, coating one of said tapes on the surface thereof with a bonding material, superposing said tapes in spaced apart relation so that said coated surface of said one tape faces the surface of said other tape, advancing said tapes simultaneously and intermittently in the direction of feed of said tapes, cutting notches in at least one edge of said tapes, feeding pieces of stem material, and inserting successively said pieces of stem material in transverse direction to said tapes and therebetween at locations thereof where notches have been cut so that said pieces of stem material project with one end thereof from between the edges at one side of said tapes toward the edges on the opposite side of said tapes but short of the latter, bonding said tapes to said pieces of stem material so as to prevent displacement thereof relative to said tapes, then severing said leaf articles from said bonded tapes at the locations of said pieces of stem material, and finally reeling up the remainder of said tapes with at least one of said edges substantially intact.

5. A machine for continuously producing laminated leaves with stems comprising a machine frame, an elongated support on said machine frame, feeding means on one end of said machine frame for supplying two superimposed tapes along said support, spacing means on said support for maintaining said tapes separated along a part of said support, a mechanism on said machine frame for feeding stem-forming material, means for cutting predetermined lengths of stems from said stem-forming material and for inserting said stems between said separated tapes to assume a position with respect to said tapes so that each of said stems projects in a direction from between the edges on one side of said tapes to terminate short of the opposite edges on the other side of said tapes, a compression element on said machine frame and opposite said mechanism for exerting pressure upon said tapes and a respective stem inserted therebetween so as to prevent displacement of said stem relative to said tapes, stamping means on said machine frame extending above said support and adapted to compressively join said tapes to each other and to said stem therebetween, said stamping means including die cutting means for simultaneously severing a plurality of leaf shapes out of the intermediate portion of said tapes when joined together so as to leave the edges of said tapes intact, reel means on the opposite end of said machine frame to gather the remainder of said tapes after passage thereof through said stamping means, and driving means on said machine frame operatively connected to said feeding means, said mechanism, said stamping means and said die-cutting means for actuating all said means and said mechanism in timed relation, said tapes extending uninterruptedly from said feeding means to said reel means.

6. A machine according to claim 5, wherein said spacing means consists of a bar extending transversely across said support and arranged to separate said tapes in a manner that one of said tapes passes over said bar, while the other of said tapes passes below said bar.

7. A machine for continuously producing laminated leaves with stems comprising a machine frame, an elongated support on said machine frame, feeding means on said machine frame for supplying two superimposed tapes along said support, spacing means on said support for maintaining said tapes separated along a part of said support, notching means on said machine frame for intermittently forming notches in at least one of said tapes, a mechanism on said machine frame for feeding stem-forming material, means for cutting predetermined lengths of stems from said stem-forming material and for inserting said stems between said separated tapes at locations thereof coinciding with said notches to assume a position with respect to said tapes so that each of said stems projects in a direction from between said edges on one side of said tapes to terminate short of the opposite edges on the other side of said tapes, a compression element on said machine frame exerting pressure upon said tapes and a respective stem inserted therebetween so as to prevent displacement of said stem relative to said tapes, stamping means on said machine frame extending over said support and adapted to compressively join said tapes to each other and to said stem therebetween, said stamping means including die cutting means for simultaneously severing a plurality of leaf shapes out of intermediate portions of said tapes so as to leave said edges of said tapes intact, real means on said machine frame at the end of said support to gather the remainder of said tapes after passage thereof through said stamping means, and driving means on said machine frame operatively connected to said feeding means, said notch means, said mechanism, said stamping means and said die cutting means for actuating said means and said mechanism in timed relation, said tapes extending from said feeding means to said reel means.

8. In a machine according to claim 7, wherein said notching means is positioned adjacent one of the edges of one of said tapes.

9. In a machine according to claim 7, wherein said mechanism includes stem feeding means for inserting predetermined lengths of stem forming material transversely between said tapes at said locations of said notches.

10. In a machine according to claim 7, wherein said notching means are positioned substantially in alignment with said mechanism, and respective guide means positioned on opposite sides of said tapes for guiding the latter, one of said guide means being positioned in proximity of said mechanism, the other of said guide means being positioned adjacent said compression element.

11. In a machine according to claim 10, wherein both said guide means are adjustably disposed with respect to said support.

HENRY B. OWENS.
JOHN H. DERRICK.

REFERENCES CITED

The following references are of record in the file of this patent:

UNITED STATES PATENTS

| Number | Name | Date |
|---|---|---|
| 1,394,037 | Mallory | Oct. 18, 1921 |
| 1,942,174 | Kaplan | Jan. 2, 1934 |
| 2,285,447 | Lichter | June 9, 1942 |
| 2,306,835 | Tucker | Dec. 29, 1942 |